United States Patent [19]

Nagao et al.

[11] Patent Number: 4,994,321
[45] Date of Patent: Feb. 19, 1991

[54] PERPENDICULAR MAGNETIC RECORDING MEDIUM AND THE METHOD FOR PREPARING THE SAME

[75] Inventors: Makoto Nagao; Kunihiko Sano; Fusao Yamanaka; Akira Nahara, all of Kanagawa, Japan

[73] Assignee: Fuji Photo Film Co., Ltd., Kanagawa, Japan

[21] Appl. No.: 506,493

[22] Filed: Apr. 5, 1990

Related U.S. Application Data

[63] Continuation of Ser. No. 7,163, Jan. 27, 1987, abandoned.

[30] Foreign Application Priority Data

Jan. 24, 1986 [JP] Japan .................................. 61-12100
Jan. 24, 1986 [JP] Japan .................................. 61-12101

[51] Int. Cl.$^5$ ............................................. G11B 23/00
[52] U.S. Cl. ................................... 428/336; 204/192.2; 204/192.16; 427/34; 427/132; 428/408; 428/694; 428/900
[58] Field of Search ............... 428/694, 695, 900, 421, 428/422, 336; 204/192.16, 192.2; 427/34, 132, 131, 41

[56] References Cited

U.S. PATENT DOCUMENTS

| | | | |
|---|---|---|---|
| 4,495,242 | 1/1985 | Arai et al. | 428/336 |
| 4,554,217 | 11/1985 | Grimm | 427/131 |
| 4,565,734 | 1/1986 | Arai | 428/216 |
| 4,581,245 | 4/1986 | Nakamura | 427/40 |
| 4,582,746 | 4/1986 | Shirahata | 427/132 |
| 4,598,022 | 7/1986 | Haque | 427/41 |
| 4,647,494 | 3/1987 | Meyerson et al. | 427/41 |
| 4,696,845 | 9/1987 | Yanagisawa | 428/421 |
| 4,713,279 | 12/1987 | Fujiwara | 428/900 |
| 4,713,288 | 12/1987 | Kokaku et al. | 427/41 |
| 4,729,924 | 3/1988 | Skorjanec | 428/421 |
| 4,745,426 | 7/1988 | Kokai et al. | 427/41 |

FOREIGN PATENT DOCUMENTS

258727 12/1985 Japan .................................. 427/131

Primary Examiner—Paul J. Thibodeau
Attorney, Agent, or Firm—Sughrue, Mion, Zinn, Macpeak & Seas

[57] ABSTRACT

A perpendicular magnetic recording medium such as a floppy disk is created by providing on at least one surface of a non-magnetic support, a magnetic layer having perpendicular magnetic anisotropy and a protective layer by sputtering. First, a magnetic layer is provided, secondly, the magnetic layer is surface treated by a plasma treatment or by applying an oxide layer or a nitride layer thereon and thirdly, the protective layer is applied thereto.

2 Claims, 2 Drawing Sheets

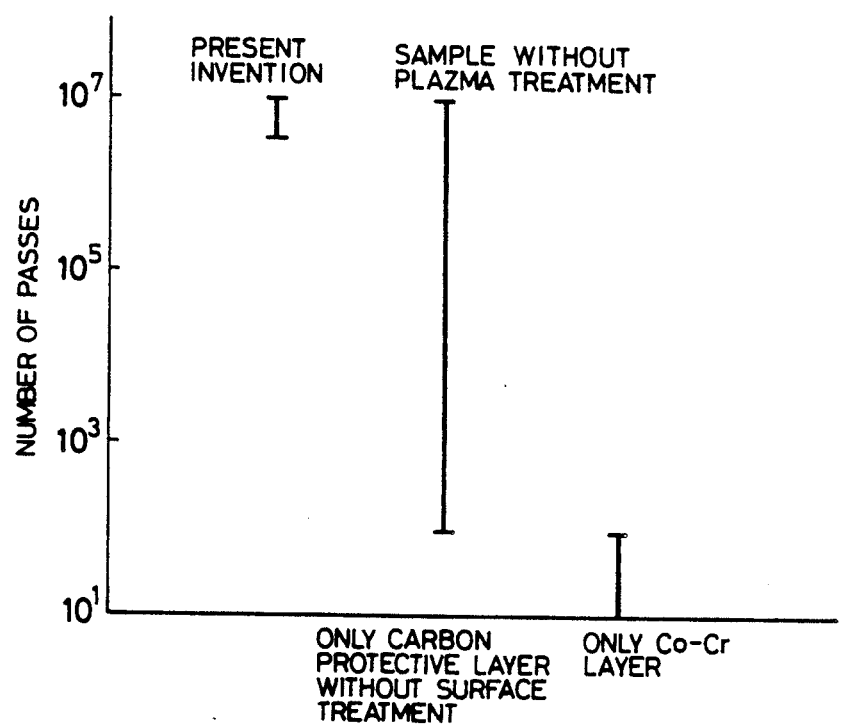
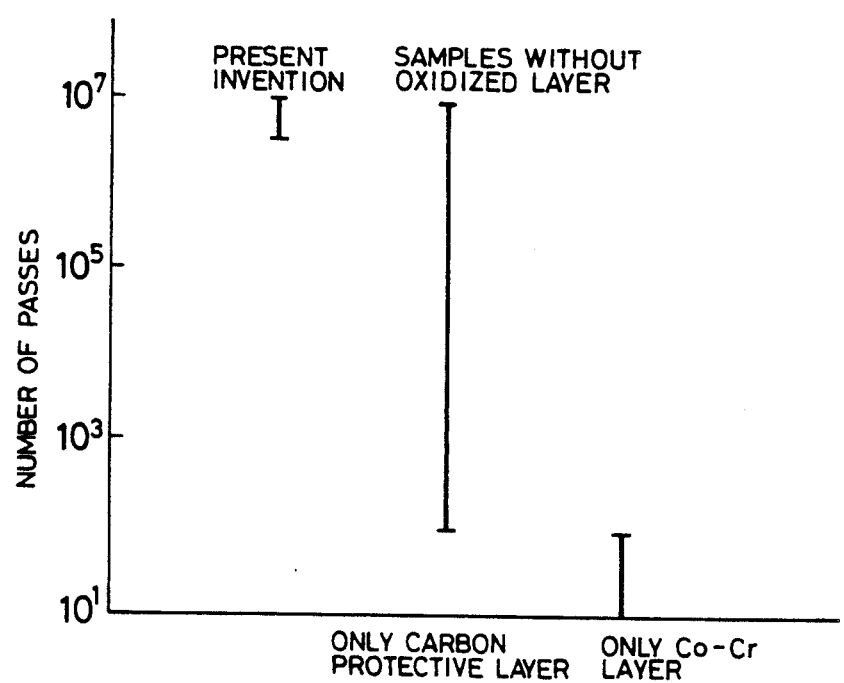

PERPENDICULAR MAGNETIC RECORDING MEDIUM AND THE METHOD FOR PREPARING THE SAME

This is a continuation of application Ser. No. 07/007,163, filed Jan. 27, 1987, and now abandoned.

FIELD OF THE INVENTION

The present invention relates to a perpendicular recording medium and the method for preparing the same, and more particularly to the production of a perpendicular recording medium having improved running durability.

BACKGROUND OF THE INVENTION

A perpendicular magnetic recording system using a magnetic recording medium having an axis of easy magnetization perpendicular to the surface of the magnetic layer thereof has recently been proposed. This perpendicular magnetic recording system is said to be substantially very suitable for high density recording, since in this system, the higher the recording density becomes, the greater the reduction in the demagnetization field of a magnetic recording medium, resulting in excellent reproduced output.

A magnetic recording medium having an axis of easy magnetization perpendicular to the surface of a magnetic layer thereof is needed to perform perpendicular magnetic recording. In this connection, the perpendicular magnetic recording medium comprises a base or a support composed of non-magnetic materials such as high molecular weight materials or non-magnetic metals having coated thereon Co-Cr alloy and the like by a sputtering method or the like.

Also the perpendicular magnetic recording medium of so called two layered type is known, wherein a layer with high magnetic permeability composed of soft magnetic materials such as, for example, a permalloy layer (Ni-Fe type alloy) is provided under the perpendicular magnetic layer composed of Co-Cr alloy as described above to improve the recording and reproducing efficiency during perpendicular magnetic recording and reproducing.

Flexible disks and the like using the above described perpendicular magnetic recording system, employ a dual perpendicular magnetic recording medium of the two layered type wherein the above described under layer is provided on both surfaces of the support and is excellent since such perpendicular magnetic recording medium can contain voluminous recorded information and curling can easily be improved for the floppy disk.

Both the perpendicular magnetic recording medium and the dual perpendicular magnetic recording medium can be prepared by coating the above described materials continuously or discontinuously on a support using a sputtering apparatus.

The above described perpendicular magnetic recording medium can largely be expected to be used as a magnetic tape and as a magnetic disk, because it is suitable for high density recording. However, such medium generally has a serious problem of poor running durability. For example, in case of a perpendicular magnetic recording disk provided with Co-Cr alloy layer, running can not often be continued beyond about 10,000 passes because of coagulation occurring on the surface of the alloy layer.

To solve the above problem, it has been proposed to provide a protective layer made of carbon, $SiO_2$ and BN, as disclosed in Japanese Patent Application (OPI) No. 133627/1983. The term "OPI" as used herein means an "unexamined published application". Alternatively, SiC, as disclosed in Japanese Patent Application (OPI) No. 130437/83 may be applied on the surface of a magnetic layer by a sputtering method.

However the above proposal to improve the running durability is not satisfactory and there is still the problem that the reproducing property of products manufactured using the same manufacturing steps is poor, that is, excellent durability can not always be obtained.

Accordingly, an object of the present invention is to provide a perpendicular magnetic recording medium having a good reproducing property and largely improved running durability.

SUMMARY OF THE INVENTION

As a result of thorough investigations to solve the above problems it was found that a perpendicular magnetic recording medium having remarkably improved running durability and good reproducing property can be obtained by providing a protective layer after conducting surface treatment such as plazma treatment. oxidation treatment or nitration treatment on the magnetic layer.

That is, the present invention relates to a perpendicular magnetic recording medium comprising a non-magnetic support having provided on at least one of surfaces, a magnetic layer having perpendicular magnetic anisotropy and a protective layer by a sputtering method, wherein first, a magnetic layer is provided, secondly, the magnetic layer is surface-treated by a plazma treatment, or by applying an oxide layer or a nitride layer and thirdly, a protective layer is applied thereon.

BRIEF EXPLANATION OF DRAWINGS

FIGS. 2 and 3 are graphs showing the results of running tests in Examples of the present invention.

DESCRIPTION OF PREFERRED EMBODIMENTS

Figure 1:
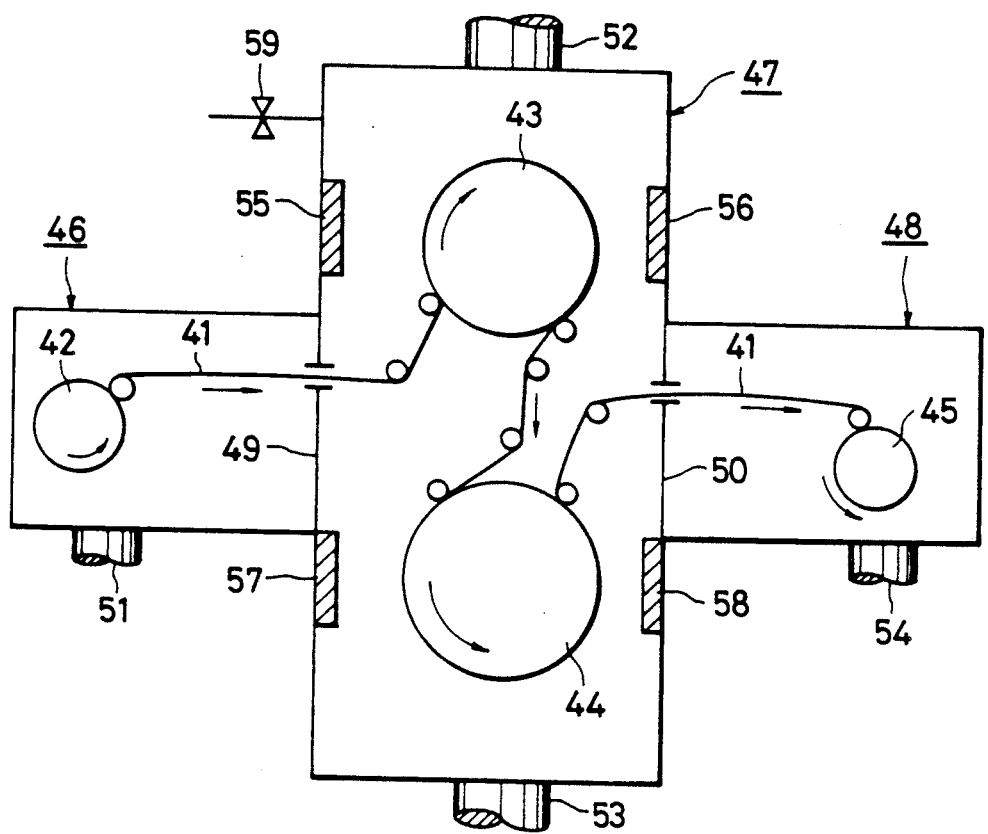
FIG. 1 is a schematic view of one apparatus for manufacturing a perpendicular magnetic recording medium of the present invention.

The present invention is described in more detail below.

In the present invention, a perpendicular magnetic film having an axis of easy magnetization perpendicular to the film surface such as, for example, Co-Cr film is first provided on one or on both of surfaces of a non-magnetic base by a thin film forming method such as a sputtering method, a vacuum evaporation method, an ion plating method, or the like. In this case, a soft magnetic film having low coercive force or high magnetic permeability such as, for example, a permalloy film may be provided by a sputtering method and so on before a perpendicular magnetic film is formed. The above described perpendicular film can be a single layer or a plural layer. A non-magnetic sublayer can be provided between the base and the perpendicular magnetic layer, and a non-magnetic intermediate layer can be provided between a soft magnetic layer and the perpendicular magnetic layer. Accordingly, the magnetic layer referred to in the present invention includes both a perpendicular magnetic film and the combination of a soft magnetic film and a perpendicular magnetic film.

As a non-magnetic base used in the present invention, film-like high molecular weight materials such as polyethylene terephthalate (PET), polyimide, polyamide and so on are particularly effective. Non-metal materials such as glass and metal materials are also used.

As a material for a soft magnetic film, not only permalloy alloy such as Ni-Fe, Ni-Fe-Mo, Ni-Fe-Mo-Cu, etc. may be used, but also soft magnetic alloy materials such as Fe, Fe-Al-Si, Fe-Ni-O, Fe-Ti, Ni-Fe-Cu-Cr-Mn, Fe-Si-B, Fe-B-C, Fe-Al, Co-V-Fe, Co-Ta, Co-Zr, Co-Nb-Zr, Co-Ti, Co-Nb-Ta, Co-Ni-Zr, Fe-Ni-P, Fe-Co-Zr, Co-Mo-Zr and the like can also be used.

The soft magnetic film may have a thickness from 0.03 to 5 microns, preferably from 0.1 to 1 micron.

For the perpendicular magnetic film, it is necessary that the axis of easy magnetization be almost perpendicular to the surface of the support and an alloy material mainly composed of Co-Cr, is preferred, which material is well known as a suitable material for a perpendicular magnetic film.

The perpendicular magnetic film should have a thickness from about 0.03 to 5 microns, preferably from 0.05 to 1 micron.

A vapour deposition method or a sputtering method can be used as a means to form a film. A so-called continuous sputtering method using an apparatus having a plurality of high speed sputtering sources installed around plural cylindrical cans as described hereinafter in Example is preferred.

As a sputtering source, Co-Cr alloy can be used. When a Co-Cr alloy film is prepared, and Co and Cr can be used separately as a target.

The cylindrical can should have a temperature of 30° C or higher to prevent magnetic anisotropy occurring inside of the hard magnetic film as prepared. The upper limit of the temperature is preferably 90° C. or lower, because at a higher temperature gas discharges from the support and oligomer is deposited.

In order to reduce the occurrence of anisotropy and unevenness of the film surface, the temperature of the can is particularly maintained preferably from 45° to 65° C. When Co-Cr film is formed it is preferable to heat the cylindrical can to 90° C or higher to obtain desired Hc (perpendicular) and it is particularly preferable to heat it to 120° C or higher. Thus, the present invention is characterized by steps such that the surface of the thus prepared magnetic layer is treated by plazma treatment, oxidation treatment or nitration treatment to provide thereon and thereafter, a protective layer.

The plazma treatment may be a glow discharge treatment using direct current or alternating current of high frequency and a reverse sputtering treatment using high frequency and direct current.

Glow discharge treatment comprises charging the magnetic recording medium provided with a magnetic layer with voltage of about 500 V within an Argon atmosphere of from $10^{-1}$ to $10^{-4}$ Torr in a vacuum bath (e.g., a sputtering apparatus), thereby generating glow discharge on the surface of a magnetic layer.

When a magnetic layer is formed by a sputtering method (wherein a cylindrical can is charged with —, and the target is charged with +). The reverse sputtering treatment comprises charging reservably (the cylindrical can is charged +, and the target is charged —) at about 500 V so that Argon beats the surface of the magnetic layer.

In this manner, on the surface of thus plasma treated magnetic layer is provided with a protective layer by a sputtering method and the like.

The oxidation treatment and nitration treatment comprise a glow discharge treatment ($O_2$ or $N_2$, about 500 V at from $10^{-1}$ to $10^{-4}$ Torr) in the presence of oxygen or nitrogen. Reverse sputtering can be conducted in the presence of oxygen or nitrogen; or oxygen ions or nitrogen ions can be shot to the surface of the magnetic layer by an ion gun. As to sputtering, the magnetic layer may be provided by a sputtering method by charging a cylindrical can and a target. Reverse sputtering comprises charging reversely (opposite polarities) in an oxygen or nitrogen atmosphere of from $10^{-1}$ to $10^{-4}$ Torr.

In this manner, the surface of the magnetic layer is thus provided with an oxide layer or nitride layer and is further provided with a protective layer by a sputtering method and the like.

Carbon, $SiO_2$, Co-O-Cr, Cr-O and the like are used and carbon is the most preferred for in preparing a protective layer.

The thickness of a protective layer is from 0.002 $\mu m$ to 0.1 $\mu m$, particularly preferably from 0.005 to 0.05 $\mu m$.

In accordance with the present invention, a perpendicular magnetic recording medium having remarkably improved running durability can be obtained with good manufacturing reproducibility.

EXAMPLE

FIG. 1 is a schematic outline of one of a sputtering apparatus for preparing the perpendicular magnetic recording medium of the present invention.

A dual perpendicular magnetic recording medium of two layered type was prepared using a dual continuous sputtering apparatus as shown in FIG. 1. The rolled polyimide film 41 having a thickness of 50 $\mu m$ was set on the send-out axis 42 so that the film 41 was wound up by a take-up axis 45 through intermediate rollers and about cooled cylindrical cans 43 and 44. The vacuum bath was divided into three rooms, that is, a sending out room 46, a sputtering room 47 and a take-up room 48 with each room partitioned off by partitions 49 and 50. Each room was degassed at degass openings 51, 52, 53 and 54. In the sputtering room, sputter cathodes 55 and 57 of DC magnetron system containing carbon and sputter cathodes 56 and 58 of RF magnetron system containing Co-Cr target (Co 82 - Cr 18 wt %) were provided.

The sputtering room 47 was vacuum degassed to $1 \times 10^{-6}$ Torr or lower and thereafter Ar gas was introduced through a gas introducing opening 59 to maintain the room about $5 \times 10^{-3}$ torr. On the polyimide film 41 sent out from the send-out axis 42 at a carrying rate of 20 mm/min, a Co-Cr film of about 3,000 Å was formed on one surface (O side) by a sputter cathode 56 at the position of can 43. Sequentially, on the other surface (I side) of the film 41 a Co-Cr film was formed of about 3,000 Å by a sputter cathode 58 at the position of can 44 and then the film was taken up by a take-up axis 45.

In case of plazma treatment, the polyimide film with both of surfaces thus provided with Co-Cr films was reversely sent out from the take-up axis 45, undergoing reverse sputtering treatment on both surfaces in an atmosphere of Ar at the positions of cans 43 and 44 by changing polarities of sputtering reversely, and was taken up at sent-out axis 42.

Sequently, putting back the polarities of sputtering, the thus treated film was sent out again from the sent-out axis 42, and at the positions of can 43 and 44, a protective layer of carbon was formed by carbon cathodes 55 and 57 on the film and the film was taken up by a take-up axis 45.

In case of oxide treatment, the polyimide film with both surfaces thus provided with Co-Cr films was reversely sent out from the take-up axis 45. The sputtering room was degassed to $1 \times 10^{-6}$ Torr or lower, stopping the Ar gas jet and maintaining oxygen gas at about $5 \times 10^{-3}$ Torr. Changing polarities of sputtering, the polyimide film received reverse sputtering in an atmosphere of oxygen at the positions of cans 43 and 44 and the film with both of its surfaces treated with oxygen was taken up by a sent-out axis 42.

Then, by restoring the oxygen atmosphere to an Ar atmosphere and putting back the sputtering polarities, the thus oxide treated polyimide film was sent out again from the send-out axis 42, a protective layer of carbon having a thickness of 200 Å was formed by carbon cathodes 55 and 57 at the positions of can 43 and 44, on the film, and then the film was taken up by take-up axis 45.

The nitration treatment was carried out in the similar manner as in the case of oxide treatment.

The thus prepared perpendicular magnetic recording medium was cut into a disk having a diameter of 3.5 inches and was inserted into a commercially available disk jacket.

After recording was preformed on the commercially available floppy disk drive, the disk was rotated at 600 r.p.m. and while monitoring the reproduced signals, the disk was kept running until it stopped. The number of passes until the disk stoped was measured. (This test was terminated at maximum passes of 10,000,000.)

For comparison, perpendicular magnetic recording media prepared without plazma treatment (reverse sputtering treatment), oxidation treatment (reVerse sputtering at oxygen atmosphere) or nitration treatment (reverse sputtering at nitrogen atmosphere) and the perpendicular magnetic recording medium having only Co-Cr layer were prepared and the tests were carried out in the similar manner as above. Ten samples were prepared for each case and were tested. FIG. 2 shows the results when plazma treatment was performed, and FIG. 3 shows the result when oxidation treatment was performed.

As clear from FIGS. 2 and 3 samples having only Co-Cr layer were unable to continue running at about 10,000 passes or more, samples having a carbon protective layer without plasma treatment nor oxidation treatment exhibit variable running durabilities, since those samples were unable to be run at from about 10,000 to 10,000,000 passes and the reproducing property was poor, while samples of the present invention were run up to about 10,000 passes. exhibiting excellent durability and excellent sound reproducing property.

The above described samples show the cases where plazma treatment or oxidation treatment were performed by the reverse sputtering method. Plazma treatment, oxidation treatment and nitration treatment can be also performed by glow treatment.

After the above described soft magnetic layer is applied, a further Co-Cr layer can be applied thereon.

What is claimed is:

1. In a perpendicular magnetic recording disk comprising a non-magnetic base having on at least one surface thereof, a magnetic layer having perpendicular anisotropy and an overlying protective layer; the improvement wherein the surface of said magnetic layer is plasma treated; and wherein the perpendicular magnetic layer has a thickness in a range of from 0.03 to 5 $\mu$m and is comprised of an alloy mainly composed of Co-Cr and wherein the protective layer is made of carbon and said layer is formed by a sputtering method and has a thickness of from 0.002 $\mu$m to 0.1 $\mu$m.

2. In a perpendicular magnetic recording disk comprising a non-magnetic base having provided on at least one surface thereof a magnetic layer having a perpendicular anisotropy and a protective layer, the improvement comprising providing one of an oxide layer and a nitride layer between said magnetic layer and said protective layer; and wherein the perpendicular magnetic layer has a thickness in a range of from 0.03 to 5 $\mu$m and is comprised of an alloy mainly composed of Co-Cr and wherein the protective layer is made of carbon and said layer is formed by a sputtering method and has a thickness of from 0.002 $\mu$m to 0.1 $\mu$m.

* * * * *